US011589021B1

(12) United States Patent
Kuang et al.

(10) Patent No.: US 11,589,021 B1
(45) Date of Patent: Feb. 21, 2023

(54) COLOR CORRECTION FOR VIDEO COMMUNICATIONS USING DISPLAY CONTENT COLOR INFORMATION

(71) Applicant: Meta Platforms, Inc., Menlo Park, CA (US)

(72) Inventors: Jiangtao Kuang, San Jose, CA (US); Honghong Peng, Mountain View, CA (US); Yizhi Xiong, Foster City, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 228 days.

(21) Appl. No.: 16/722,524

(22) Filed: Dec. 20, 2019

Related U.S. Application Data (60) Provisional application No. 62/787,046, filed on Dec. 31, 2018.

(51) Int. Cl.
| | |
|---|---|
| *H04N 9/64* | (2006.01) |
| *H04N 9/68* | (2006.01) |
| *G06V 10/25* | (2022.01) |
| *G06V 40/16* | (2022.01) |

(52) U.S. Cl.
CPC ............. *H04N 9/646* (2013.01); *G06V 10/25* (2022.01); *G06V 40/161* (2022.01); *G06V 40/172* (2022.01); *H04N 9/648* (2013.01); *H04N 9/68* (2013.01)

(58) Field of Classification Search
CPC .......... H04N 9/646; H04N 9/648; H04N 9/68; G06K 9/00228; G06K 9/00288; G06K 9/3233
See application file for complete search history.

(56) References Cited

U.S. PATENT DOCUMENTS

| | | | |
|---|---|---|---|
| 6,993,167 B1* | 1/2006 | Skladnev | A61B 5/0059 382/128 |
| 9,883,141 B1* | 1/2018 | Breedvelt-Schouten | H04N 5/00 |
| 10,586,482 B1* | 3/2020 | Yung | G09G 3/2003 |
| 2015/0326842 A1* | 11/2015 | Huai | H04N 5/2354 348/223.1 |
| 2017/0124943 A1* | 5/2017 | Peana | G09G 3/3225 |
| 2018/0234607 A1* | 8/2018 | Keller | H04N 5/23218 |
| 2020/0137266 A1* | 4/2020 | Sato | H04N 9/73 |
| 2020/0204853 A1* | 6/2020 | Mehrl | H04N 21/4318 |
| 2021/0304559 A1* | 9/2021 | Cupersmith | B25J 9/1664 |
| 2022/0044611 A1* | 2/2022 | Peana | G09G 3/2096 |

* cited by examiner

*Primary Examiner* — Wesley J Tucker
(74) *Attorney, Agent, or Firm* — Shumaker & Sieffert, P.A.

(57) ABSTRACT

Video presence systems are described that detect an area of interest (e.g., facial region) within captured image data and analyze the area of interest using known color information of the content currently being presented by a display, along with measured ambient light color information from a color sensor, to determine whether the area of interest (e.g., face) is currently illuminated by the display or whether the AOI is not affected by the display and instead only illuminated by the ambient light. Upon determining that the display casts color shade on the AOI, the video presence system preprocesses the image data of the detected area of interest to correct the color back to skin color under ambient light prior to performing general white balance correction.

19 Claims, 6 Drawing Sheets

COLOR CORRECTION FOR VIDEO COMMUNICATIONS USING DISPLAY CONTENT COLOR INFORMATION

This application claims the benefit of U.S. Provisional Patent Application No. 62/787,046, filed Dec. 31, 2018, the entire contents of which are incorporated herein by reference.

TECHNICAL FIELD

This disclosure generally relates to communication systems, and more particularly, to systems for video communications.

BACKGROUND

Video conferencing, including video chat software and services, is becoming an increasingly popular way for friends, families and business associates to communicate. For example, people are increasing adding cameras, referred to as webcams, to digital displays, such as televisions (TVs), computer displays and tablets, to gain the ability to video conference using various software services. In addition, dedicated video presence systems with built-in cameras and with displays sized for video communications are frequently used by corporations to provide remote conferencing abilities.

SUMMARY

General camera image signal processing for many video conferencing systems uses image pixel statistics information to estimate ambient light information and conduct color processing to perform auto white balancing (AWB). However, when people sitting in front of a display use a camera or webcam for tele-conferencing or video chat, their faces are illuminated not only by the light ambient to the room, but also by the light from the display. The light emitted from the display often cast color shades on the faces of people in front of the display, especially when ambient lights are dim comparing to display. It is very challenging to get the correct white balance information under mixed lighting, especially under artificial lights which are emitted from display, which is dependent on the display content.

More specifically, this disclosure describes various example video presence systems that detect a facial region within captured image data and analyze the facial region using known color information of the content currently being presented by the display, along with measured ambient light color information from a color sensor, to determine whether the face is currently illuminated by the display or whether the face is not affected by the display and instead only illuminated by the ambient light. Upon determining that the display casts color shade on the face, the video presence systems pre-processes the image data of the detected area of interest to correct the face color back to skin color under ambient light prior to performing general white balance correction. If, however, the face is currently not experiencing significant color shading of face color from the display, the video presence systems apply white balance correction directly to the image data without pre-processing the image data for the area of interest.

In some examples, as further described herein, the video presence systems may be configured to perform facial recognition and to pre-process the facial color back to skin color only upon detecting a facial image of a known, pre-defined user. In such an example, one or more users may configure the video presence system by capturing respective self-calibration images under pre-determined (e.g., bright) ambient light conditions. The video presence system uses the calibration images for face recognition training and extracts the skin color characteristics for each user. During operation, when the video presence system detects a facial region, the system performs facial recognition to determine the presence of one or more known users within the scene. Upon detecting one or more know users, the video presence system uses the skin color characteristics of the user for face color analysis in order to determine whether the face color of the user is currently being affected by the display emitted light. This may, for example, improve the stability and accuracy of the system.

Accordingly, the techniques of the disclosure provide specific technical improvements to the computer-related field of rendering and displaying content within a video presence system. A video presence system as described herein may provide a high-quality communication experience that remains consistent across a variety of lighting conditions and across a variety of image capture systems.

In one example, a system comprises a video conference application configured to output display content on a display, an input capture system configured to capture image data of a user, and an area of interest (AOI) detector configured to identify an area of interest within the image data. The system further comprises an AOI color analyzer configured to analyze the image data associated with the identified AOI and determine, based on color information associated with the display content and measured ambient light color information, whether the area of interest was illuminated by light from the display during capture of the image data. An AOI color corrector is configured to, responsive to determination that the area of interest was illuminated by light from the display, perform color correction on the image data associated with the area of interest.

In another example, a method comprises outputting, with a video conference application, display content on a display, capturing image data of a user, and identifying an area of interest (AOI) within the image data. The method further includes analyzing the image data associated with the identified AOI to determine, based on color information for the display content and measured ambient light, that the area of interest was illuminated by light from the display during capture of the image data, and responsive to determination that the area of interest was illuminated by light from the display, performing color correction on the image data associated with the area of interest.

In another example, a non-transitory, computer-readable medium comprising instructions that, when executed, cause one or more processors to output, with a video conference application, display content on a display, capture image data of a user, and identify an area of interest (AOI) within the image data. The instructions further cause the processor to analyze the image data associated with the identified AOI to determine, based on color information for the display content and measured ambient light, that the area of interest was illuminated by light from the display during capture of the image data, and responsive to determination that the area of interest was illuminated by light from the display, perform color correction on the image data associated with the area of interest.

In another example, a video presence system, comprises a display, a camera, an ambient light sensor, and one or more processor configured to execute a video conference application configured to output display content on a display. The system further includes a color correction unit connected to the ambient light sensor, wherein the color correction unit corrects an image captured by the camera before transmitting the color corrected image, and wherein the color correction includes a first correction based on display light associated with the display content and a second correction based on the ambient light measurement.

In another example, a method comprises detecting one or more known faces in image data captured by a video camera, receiving a measurement of ambient light falling on the scene, and determining chromaticity in display content output on a display during capture of the image data. The method includes analyzing color of the image data for each detected known face to determine, for each area and based on the chromaticity of the received display content and known skin color characteristics of each known face, whether the known face is affected by light from a display displaying the display content. The method further includes, when any of the known faces are affected by light from a display displaying the display content: correcting image data for each affected known face to a color approximating the color of the known face at the current ambient light; and applying ambient light correction across the image. When none of the known faces are affected by light from a display displaying the display content, ambient light correction may be applied across the image.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

When people sit in front of a display using the front camera or a webcam for tele-conferencing or video chat, their faces are illuminated by both the light ambient to the room and by the light generated by the display. As displays get larger and brighter, the light emitted from the display has an increasingly strong effect on the scene when compared to the ambient light, especially when the ambient light is dim. When the ambient light is dim, displays may cast strong color shades on the people and objects in the scenes, generating an unnatural look in images captured by the video camera or webcam. This disclosure describes techniques for performing facial color analysis and correction using color information for content currently being presented by a display. The techniques may be especially advantageous in under mixed lighting situations where the face is illuminated by light emitted by a display along with ambient light.

For example, as the size of display screens used for conferencing and video chat continue to increase, the effects of the light emitted by the display on the scene being imaged becomes increasingly problematic. In consumer televisions, for example, 65" TVs are the mainstream in the current consumer market, while 75" and 85" TVs are becoming more and more popular and are expected to become mainstream in a couple of years. At the same time, displays are getting brighter. Today's TVs average to around 500-1,000 nits, while some TVs are pushing to 2,000 nits. High-dynamic-range (HDR) video formats (e.g., HDR10 and Dolby Vision) require the TV to have at least 1,000 nits of peak luminance. As displays get larger and brighter, the light emitted from the display has an increasingly strong effect on the scene when compared to the ambient light, especially when the ambient light is dim. If the ambient light is dim, displays may cast strong color shades on the people and objects in the scenes, generating an unnatural look in images captured by the video camera or webcam.

In general, this disclosure describes techniques for performing area of interest (e.g., facial) color analysis and color correction using color information for content currently being presented by a display. The techniques may be especially advantageous in mixed lighting situations where the area of interest (e.g., face) is illuminated by light emitted by a display along with ambient light.

Figure 1:
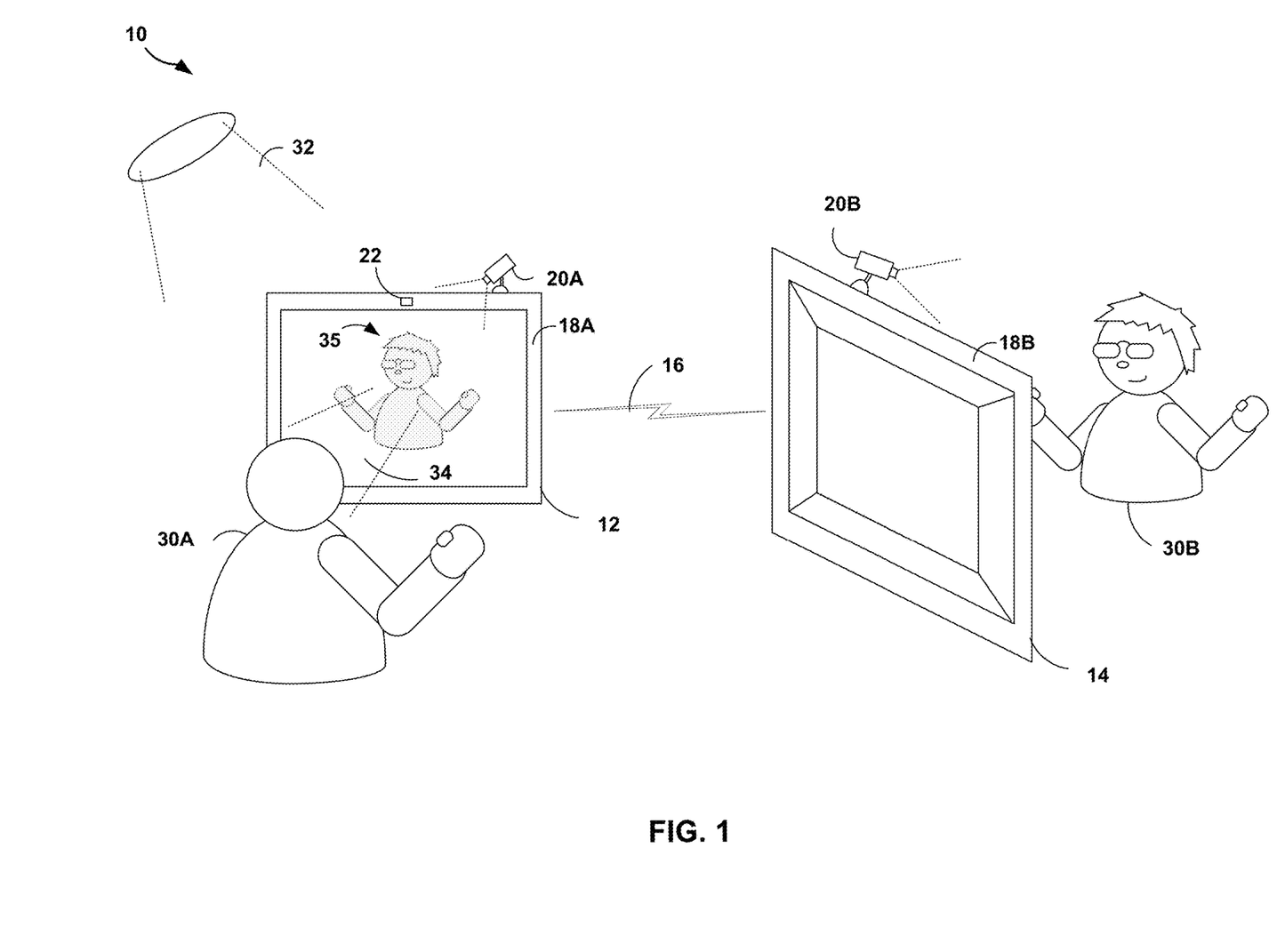
FIG. 1 is an illustration depicting an example video communications system having one or more video presence systems, at least one of the video presence systems including a color correction unit that adaptively applies color correction based on both ambient light and the light from the display, in accordance with the techniques of the disclosure.

FIG. 1 is an illustration depicting an example video communications system 10 having video presence systems 12, 14 engaged in a video conference. As described herein, at least one of the video presence systems that adaptively applies color correction based on both ambient light and the light from the display, in accordance with the techniques of the disclosure. Video presence systems 12, 14 of FIG. 1 are shown for purposes of example and may represent any video conferencing device, such as a mobile computing device, laptop, tablet, phone, server, wearable or dedicated conferencing equipment.

In the example of FIG. 1, video communications system 10 includes a first video presence system 12 connected to a second video presence system 14 over a communications channel 16. Each video presence system 12, 14 includes a display 18 and an image capture system 20 with voice and image capture capabilities. In the example shown in FIG. 1, a user 30A uses video presence system 12 to communicate with a user 30B via video presence system 14. In the example shown in FIG. 1, video presence system 12 includes a display 18A, an image capture system 20A, an ambient light color sensor 22 and a color correction unit 36 connected to ambient light color sensor 22. Video presence system 14 includes a display 18B and an image capture system 20B. In some example approaches, the image capture system 20A, the color correction unit 36 and the ambient light color sensor 22 are all integrated into a single module. In some such example approaches the module further includes display 18A.

In one example approach, display 18 and image capture system 20 are configured to operate as video communication equipment, while ambient light color sensor 22 provides color information regarding the ambient light. In some example approaches, ambient light color sensor 22 uses color filters that may, for instance, be specially designed to simulate the human visual system. Further, a spectral response sensitivity function for ambient light color sensor 22 may be selected to be close to the human eye's color matching function (CMF). Such a sensor 22 provides accurate Chromaticity measurement of the ambient light. In addition, in some example approaches, a diffuser may be placed on top of the sensor 22 to increase field of view (FOV) of the sensor 22. In such example approaches, ambient light color sensor 22 is typically not biased by a single color within the view but instead is configured to provide an accurate overall measurement of ambient light in a wide field of view.

In the example of FIG. 1, user 30A is illuminated both by ambient light (depicted in FIG. 1 as ambient light 32 falling on user 30A) and by the light emitted from display 18A (depicted in FIG. 1 as display light 34 falling on user 30A). Ambient light color sensor 22 may be used to compensate for the effects of ambient light 32 but is less successful in addressing the effects of display light 34. Therefore, in various examples described herein, video presence system 12 performs facial color analysis and correction using color information for content currently being presented by display 18A. The techniques may be especially advantageous in under mixed lighting situations where the face of a user, such as user 30A, is illuminated by light emitted by a display along with ambient light.

As further described below, in some examples, video presence system 12 includes a color correction unit that operates to correct for both ambient light 32 and display light 34 based on information from the ambient light color sensor 22 and on knowledge (a priori knowledge) of the display content 35 currently being displayed or that will be displayed in the future on display 18A. As further described herein, in some approaches, video presence system 12 monitors areas of interest, such as the face of user 30A, within captured image data of to be transmitted to video presence system 14, determine effects, if any, light 34 emitted by display 18A has on the areas of interest, and corrects the captured image to compensate for the effect of the light from display 18A.

More specifically, as described herein, the color correction unit of video presence system 12 may process image data captured by image capture system 20A to detect an area of interest (e.g., facial region) within the captured image data and analyze the facial region using known color information of the content 35 currently being presented by display 18A, along with measured ambient light color information from ambient color sensor 22, to determine whether the area of interest (e.g., face) of user 30A is currently illuminated and effected by light 34 from the display or whether the face is not affected by the display and instead only illuminated by the ambient light 32. Video processing system may, for example, analyze color information for the detected facial region of user 30A within the image data to determine whether a face color within the captured image data is within a statistical skin color area in a Chromaticity diagram for the display content light 34 based upon the known display content 35 currently being projected by display 18A. If the face color is within the statistical skin color area in Chromaticity diagram, video processing system determines that the face of user 30A is currently being illuminated by display 18A. Otherwise, video processing system 12 determines that the face of user 30A is currently not affected by the content display light 34 emitted by display 18A but, instead, is only illuminated by ambient light 32.

Upon determining that light 34 from display 18A casts color shade on the face of user 30A or otherwise affects the image quality of the area of interest, video presence systems 12 pre-process the image data from image capture system 20A associated with the detected area of interest to correct the color to an expected color (e.g., face color back to skin color) under ambient light prior to applying any additional general white balance correction to the captured image data for the video call. If, however, the face of user 30A is currently not experiencing significant color shading of face color from light 34 emitted by display 18A, color correction unit 111 of video presence system 12 applies white balance correction directly to the image data without pre-processing the image data.

In some example implementations, although not required, video presence system 12 may be configured to perform facial recognition and to pre-process the facial color back to skin color only upon detecting a facial image of a known, pre-defined user. In such an example, one or more users, such as user 30A, may configure video presence system 12 by capturing respective self-calibration images (e.g., via image capture system 20A) under pre-determined (e.g., bright) ambient light conditions. Video presence system 12 may store the calibration images as saved as AOI images, and use the calibration images for face recognition training as labelled training data to learn the characteristics of the known user, e.g., thus, in this example, training a neural network for area of interest detection. Moreover, video presence system 12 may extract from the AOI images skin color characteristics for each user. During operation, when video presence system 12 detects a facial region, the detector performs facial recognition to determine the presence of one or more known users within the scene. Upon detecting one or more know users, video presence system 12 uses the skin color characteristics 130 of the user for face color analysis in order to accurately determine whether the face color of the user is currently being affected by content display light 34 emitted by display 18A. This may, for example, improve the stability and accuracy of the system.

In some examples, video presence system 12 need not perform area of interest analysis. An example implementation of video presence system 12 may, for example, include display 18A, a camera 20A, an ambient light sensor 22, one or more processor configured to execute a video application configured to output display content 35 on the display. A color correction unit of video presence system 12 connected to ambient light sensor 22 may be configured to correct an image captured by camera 20A before transmitting the color corrected image to video presence system 14, wherein the color correction includes a first correction based on display light 34 associated with the display content 35 and a second correction based on the ambient light measurement.

Figure 2:
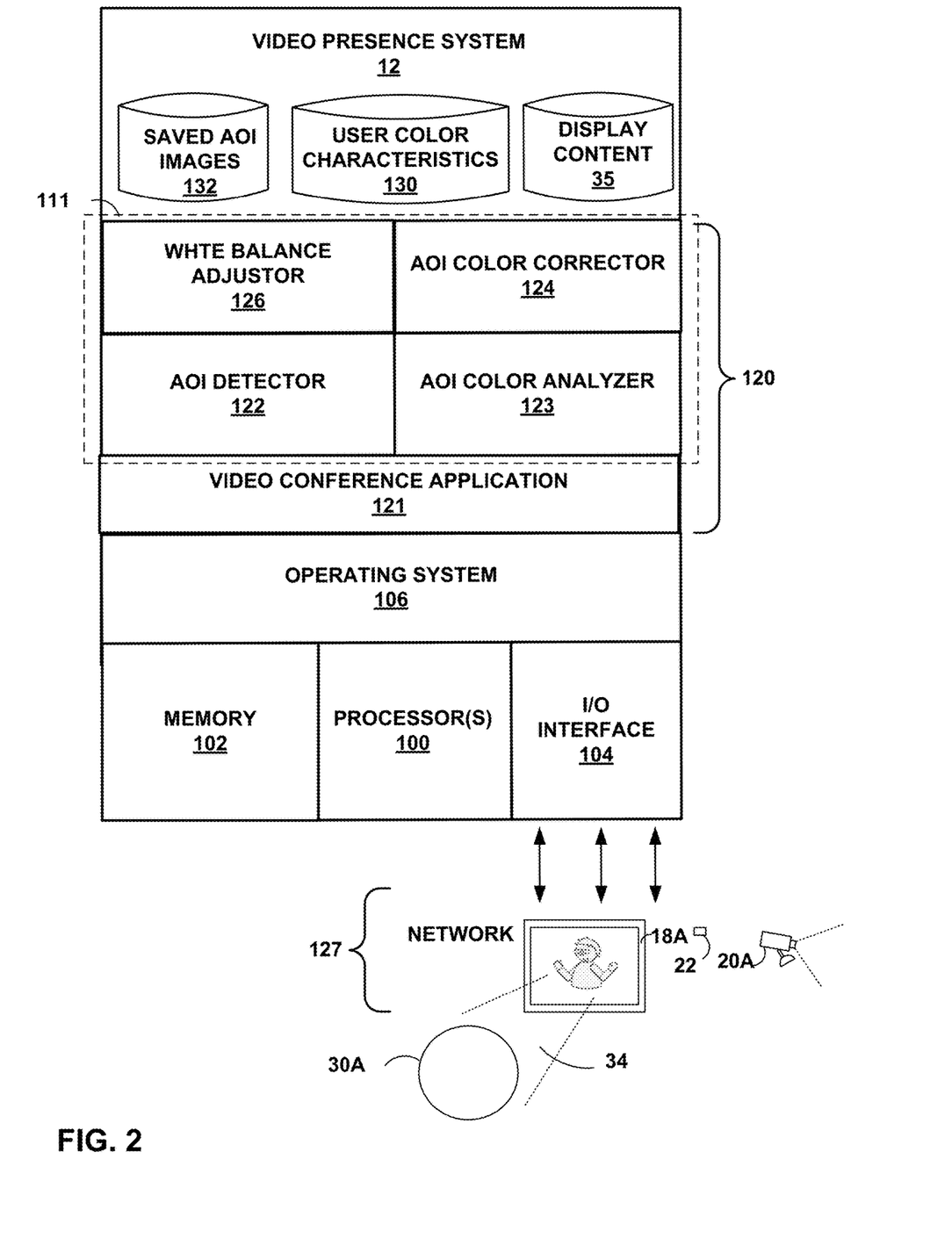
FIG. 2 is a block diagram illustrating an example video presence system, in accordance with the techniques of the disclosure.

FIG. 2 is a block diagram illustrating an example video presence system 12 that adaptively applies color correction based on both ambient light and the light from the display, in accordance with the techniques of the disclosure. For purposes of example, video presence system 12 is explained in reference to FIG. 1.

In the example shown in FIG. 2, video presence system 12 includes memory 102 and one or more processors 100 connected to memory 102. In some example approaches, memory 102 and the one or more processors 100 provide a computer platform for executing an operation system 106. In turn, operating system 106 provides a multitasking operating environment for executing one or more software components 120. As shown, processors 100 connect via an I/O interface 104 to external systems and devices, such as a display 12, ambient light sensors (e.g., sensor 22), keyboard, display 12, game controllers, display devices (e.g., display 18A), image capture devices (e.g., image capture system 20A), and the like. Moreover, network interface 112 may include one or more wired or wireless network interface controllers (NICs) for communicating via communication channel 16, which may represent a packet-based network.

In the example implementation, software components 120 of video presence system 12 includes video conference application 121 and a color correction unit 111 having an areas of interest (AOI) detector 122, an AIO color analyzer 123, an AOI color corrector 124 and a white balance adjustor 126. In some example approaches, software components 120 represent executable software instructions that may take the form of one or more software applications, software packages, software libraries, hardware drivers, and/or Application Program Interfaces (APIs). Moreover, any of software components 120 may display configuration menus on display 18A or other such display for receiving configuration information.

In general, video conference application 121 includes functionality to provide and present a video conference between two or more users 30. For example, video conference application 121 receives an inbound stream of audio data and video data from video presence system 14 and presents, via I/O interface 104, the audio and video data to user 30A via, for example, an audio output device (e.g., speakers) and display 18A, respectively. Video data presented to user 30 by video conference application 121 is shown generally in FIG. 2 as display content 35 which, when presented by display 18A, causes the display to emit light 34. Similarly, video conference application 121 captures audio data by a microphone and image data by image capture system 20A and transmits the audio/video data to video presence system 14 for presenting to user 30B. Video conference application 121 may include, for example, one or more software packages, software libraries, hardware drivers, and/or Application Program Interfaces (APIs) for implementing the video conferencing session.

In the example of FIG. 2, AIO detector 122 of color correction unit 111 processes image data captured by the image capture system (e.g., image capture system 20A) to detect an area of interest (e.g., a facial region) within the captured image data. AOI color analyzer 123 analyzes the image data associated with the identified area of interest (e.g., facial region) using known color information of the display content 35 currently being presented by display 18A, along with measured ambient light color information from ambient color sensor 22, to determine whether the face of user 30A is currently illuminated by light 34 from the display or whether the face is not affected by the display and instead only illuminated by the ambient light 32. AOI color analyzer 123 may, for example, determine the color characteristics and brightness of display light 34 according to characteristics and color information associated with display content 35 currently being presented. As one example, AOI color analyzer 123 may, for example, analyze color information for the detected facial region of user 30A within the image data to determine whether the face color is within the statistical skin color area in a Chromaticity diagram for the display content light 34 based upon the known display content 35 currently being projected by display 18A. Display content 35 may be, for example, content retrieved by processors 100 from a content repository, image data from an image and/or video stream, content from a web page, application, service or the like.

If the face color is within the statistical skin color area in Chromaticity diagram, AOI color analyzer 123 determines that the face of user 30A is currently being illuminated by display 18A. Otherwise, AOI color analyzer 123 determines that the face of user 30A is currently not affected by the content display light 34 emitted by display 18A but, instead, is only illuminated by ambient light 32.

Based upon the determination that light 34 from display 18A casts color shade on the face of user 30A, AOI color corrector 124 pre-process the image data from image capture system 20A to correct the face color back to skin color under ambient light prior to application of general white balance correction by white balance adjustor 126. If, however, the face of user 30A is currently not experiencing significant color shading of face color from light 34 emitted by display 18A, white balance adjustor 126 applies white balance correction directly to the image data without pre-processing the image data.

In some example implementations, video presence system 12 may be configured to perform area of interest (e.g., facial) recognition and to pre-process the color of the area of interest (e.g., facial color) back to expected color (e.g., skin color) only upon detecting a known, pre-defined user. In such an example, one or more users, such as user 30A, may configure video presence system 12 by capturing respective saved AOI images 132 under pre-determined (e.g., bright) ambient light conditions. AOI detector 122 uses saved AOI images 132 for face recognition training for detecting known users in subsequently captured image data. During this training and calibration process, AOI color analyzer 123 may analyze the areas of interest identified in AOI images 132 captured in good lighting conditions, and save color characteristics for aspects of the users shown in the image. In one example approach, the color characteristics are stored in color characteristics repository 130 and, optionally, the saved images are stored in saved AOI images repository 132.

In these examples, during operation, AOI detector 122, having been trained on saved AOI images 132, performs facial recognition to determine the presence of the one or more known users within the current image data captured via image capture system 20A. Upon detecting one or more know users, AOI color analyzer 123 uses color data indicative of the skin color characteristics of the respective user, as extracted from saved AOI images 132, for face color analysis in order to determine whether the face color of the user is currently being affected by content display light 34 emitted by display 12. This may, for example, improve the stability and accuracy of the system in determining whether the user is currently experiencing color shading due to light 34 emitted by display 18A.

In this way, various examples of video presence device 12 receive image data, analyzes color across the image data, determines whether one or more areas of interest (e.g. faces) has been affected by the light of display 18 and, if so, performs color correction pre-processing on the areas of interest to remove the effects of the added display light before correcting for ambient light based on, for example, measurements received from ambient light color sensor 22.

In some example approaches, video presence system 12 is a single computing device, such as a workstation, a desktop computer, a laptop. In other examples, the functions performed by video presence system 12, such as at least a portion of AOI detector 122A, AOI color analyzer 123, AOI color corrector 124, white balance adjustor 126, saved AOI images 132 and/or characteristics of display content 35, may be distributed across a cloud computing system, a data center, or across a public or private communications network, including, for example, the Internet via broadband, cellular, Wi-Fi, and/or other types of communication protocols used to transmit data between computing systems, servers, and computing devices. In some examples, processors 100 and memory 102 may be separate, discrete components. In other examples, memory 102 may be on-chip memory collocated with processors 100 within a single integrated circuit.

Each of processors 100 may comprise one or more of a multi-core processor, a controller, a digital signal processor (DSP), an application specific integrated circuit (ASIC), a field-programmable gate array (FPGA), or equivalent discrete or integrated logic circuitry. Memory 102 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Figure 3:
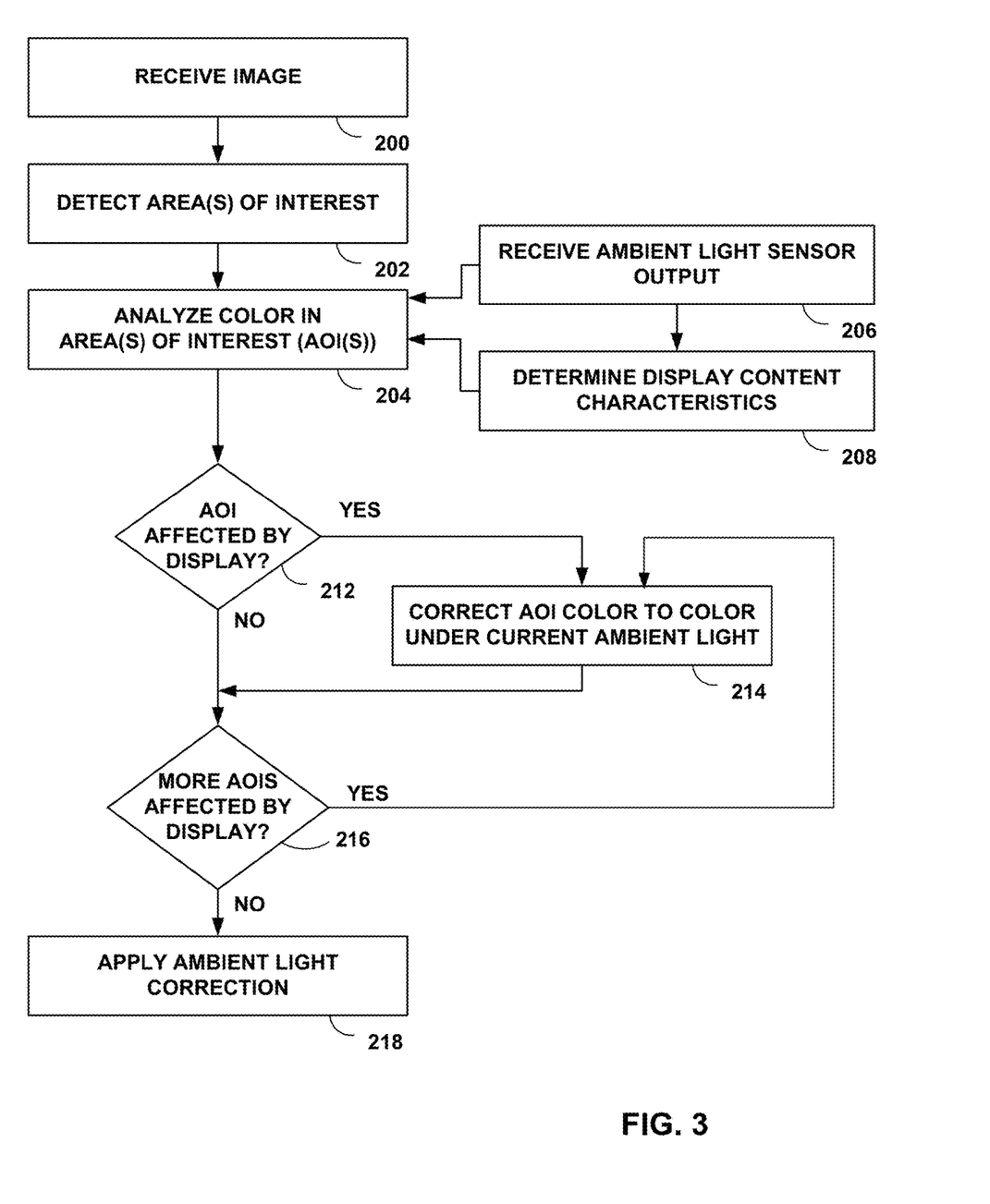
FIG. 3 is a flowchart illustrating operation of one example a video presence system of in accordance with the techniques of the disclosure.

FIG. 3 is a flowchart illustrating example operation of video presence system 12 of FIGS. 1 and 2, in accordance with the techniques of the disclosure. In the example shown in FIG. 3, video presence system 12 receives image data (200), which may comprise a single image or a video stream captured by input capture device 20A.

AOI detector 122 process the image data to detect the presence of one or more areas of interest (202). In one example approach, AOI detector 122 is a face detector that analyzes the image data and determines the boundaries of one or more faces in the image data.

AOI color analyzer 123 analyzes the image data within the boundaries determined by AOI detector 122 and determines, for each area of interest, whether the image data indicates that the color shading of the physical area of interest (e.g., face) has been affected by the light 34 emitted by display 18 (204). During this process, AOI color analyzer utilizes as inputs ambient light measurements from ambient light sensor 22 (206) as well as color information for display content 35 currently being displayed on display 18 (208) to determine whether the AOI (e.g., the face of user 30A) is currently being illuminated and affected by light 34 emitted by display 18A. For example, AOI color analyzer 123 may process the image data for the detected area of interest to determine whether the color information for the detected area of interest is within a pre-determined statistical skin color area in a Chromaticity diagram for the current display content 35 being displayed. If the face color is within the statistical skin color area in Chromaticity diagram, AOI color analyzer 123 determines that the face of user 30A is currently being illuminated by display 18A. Otherwise, AOI color analyzer 123 determines that the face of user 30A is currently not affected by the content display light 34 emitted by display 18A but, instead, is only illuminated by ambient light 32.

If AOI color analyzer 123 determines that the area of interest was affected by display light 34, AOI color corrector 124 pre-processes the image data to correct the color in the region of the area of interest to an approximate color for the area of interest (e.g., face) at the measured ambient light (214) before white balance adjustor 126 process the entire image data to perform ambient light color correction via white balance adjustor 126 (218). If, however, AOI color analyzer 123 determines that the area of interest was not affected by the display light 34 or was not affected by a significant degree, the process moves directly to ambient light correction via white balance adjustor 126 without pre-processing the color within the detected area of interest (218).

Prior to performing ambient light color correction, AOI color analyzer 123 determines whether there are any remaining areas of interest affected by display light 34. If so, AOI color corrector 124 corrects the color in the region of the area of interest to approximate color in the area of interest at the measured ambient light (214) before white balance adjustor 126 performs ambient light color correction on the entire image(s) (218). If, however, there are no remaining areas of interest affected by display light 34, white balance adjustor 126 proceeds to apply ambient light correction based on the measurements received from ambient light color sensor 22 (218).

As discussed above, according to certain examples, a video presence system may be configured to perform facial recognition and to determine whether display content is impacting areas of interest, and performing pre-processing color correction within those areas, only upon detecting an area of interest (e.g., face) of a known, pre-defined user. In such examples, users capture, under good lighting conditions, images of areas of interest (such as faces) via image capture system 20. A video presence system uses the images for face recognition training and to extract skin color characteristics of their face. When color correction unit 36 detects users who have gone through this process, unit 36 uses the skin color characteristics associated with each user to perform face color analysis and to decide whether the face color is affected by the display emitted light. Such an approach improves the stability of detection and correction in color correction unit 36.

In one example approach, the technique relies on color characteristics determined by analyzing images provided beforehand by users of video presence system 12. In one example approach, color correction unit 36 is configured to color correct regions of an image based on knowledge of the user when the user is known to video presence system 12. In some such example approaches, color correction unit 36 of video presence system 12 receives information representative of display content 35 and determines, based on display content 35 and on prior knowledge of color characteristics of the user, whether the areas of interest are being affected by the light of display 18A. In other such example approaches, color correction unit 36 of video presence system 12 receives information representative of display content 35 and determines, based on display content 35, ambient light measurements by sensor 22 and on prior knowledge of color characteristics of the user, whether the areas of interest are being affected by the light of display 18A.

In one example approach, color correction for faces and other areas of interest is configured for pre-defined areas of interest only. In one such example approach, users capture images of their face using image capture system 20 under good lighting conditions. A stand-alone color correction unit 36 or a color correction unit 36 integrated in image capture system 20 then uses the images for face recognition training and to extract skin color characteristics of their face. When color correction unit 36 detects users who have gone through this process, unit 36 uses the skin color characteristics associated with each user's face to perform face color analysis and to decide whether the face color is affected by the display emitted light. Such an approach improves the stability of detection and correction in color correction unit 36.

Figure 4:
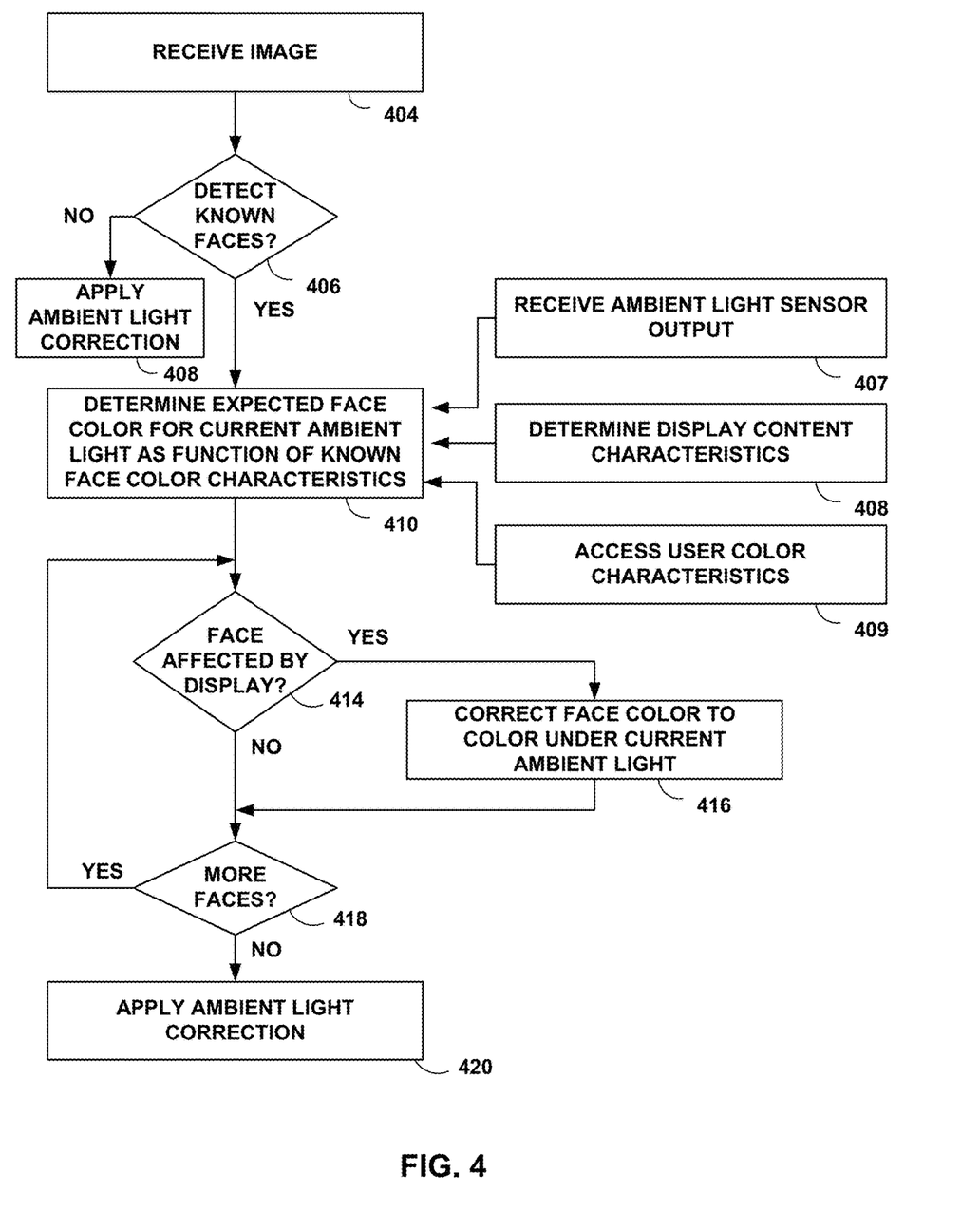
FIG. 4 is a flowchart illustrating operation of another example of the video presence system in accordance with the techniques of the disclosure.

FIG. 4 is a flowchart illustrating example operation in implementations where video presence system 12 of FIGS. 1 and 2 is configured to perform area of interest recognition and color correction only when a know user is detected by video presence system 12.

In the example shown in FIG. 4, video presence system 12 receives image data (404), which may comprise a single image or a video stream captured by input capture device 20A. AOI detector 122 process the image data to detect the presence of one or more areas of interest and, based on prior training using saved AOI images 132 as labelled training data, determines whether any detected area of interest (e.g., face) matches any of the users (406).

If no known faces are detected, the process moves directly to ambient light correction via white balance adjustor 126 without pre-processing the color within the detected area of interest (408).

If, however, AOI detector 123 detects areas of interest for one or more known users (YES of 406), AOI color analyzer 123 analyzes the image data within the boundaries of the areas of interest as determined by AOI detector 122 and determines, for each area of interest, whether the image data indicates that the color shading of the physical area of interest (e.g., face) has been affected by the light 34 emitted by display 18 (410). During this process, AOI color analyzer utilizes as inputs ambient light measurements from ambient light sensor 22 (407), color information for display content 35 currently being displayed on display 18 (408) and user-specific color characteristics (409) to determine whether the particular AOI (e.g., the face of user 30A) is currently being illuminated and affected by light 34 emitted by display 18A. In this way, AOI color analyzer of video presence system 12 receives information representative of display content 35 and determines, based on display content 35 and on prior knowledge of color characteristics of the user, whether the areas of interest are being affected by the light of display 18A. That is, this determination may be made, based at least in part, on the saved characteristics associated with the known user and the ambient light measured by ambient light color sensor 22. For example, AOI color analyzer 123 may process the image data for the detected area of interest to determine whether the color information for the detected area of interest is within a statistical skin color area in a Chromaticity diagram, where the skin color area is determined as a function of the current display content 35 being displayed in view of the known skin color characteristics of the user. If so, AOI color analyzer 123 determines that the face of known user 30A is currently being illuminated by display 18A (YES of 414). Otherwise, AOI color analyzer 123 determines that the face of known user 30A is currently not affected by the content display light 34 emitted by display 18A but, instead, is only illuminated by ambient light 32 (NO of 414).

Figure 5:
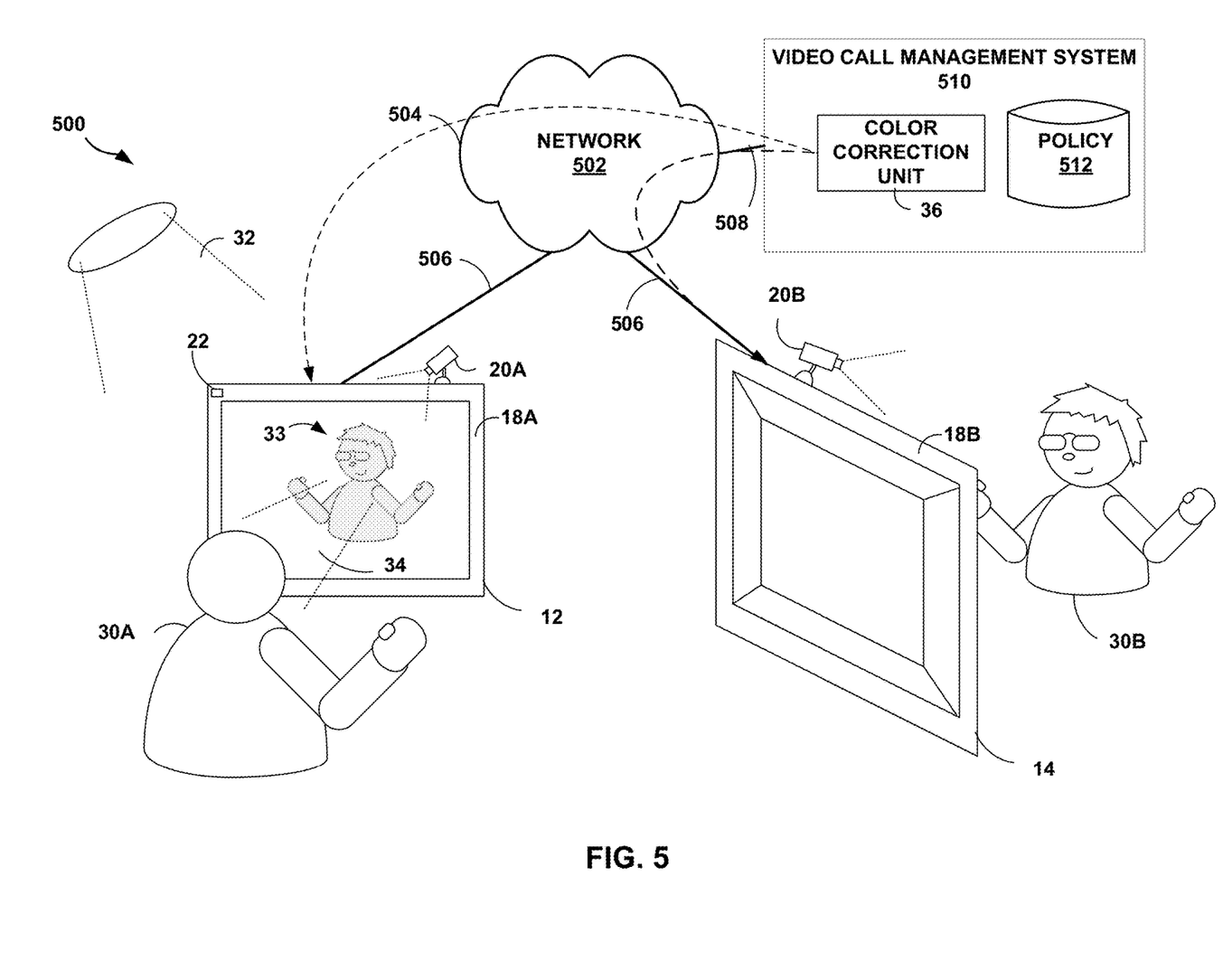
FIG. 5 is an illustration depicting another example video communications system having one or more video presence systems, at least one of the video presence systems including a color correction unit that adaptively applies color correction based on both ambient light and the light from the display, in accordance with the techniques of the disclosure.

FIG. 5 is an illustration depicting another example video communications system having one or more video presence systems, at least one of the video presence systems including a color correction unit that adaptively applies color correction based on both ambient light and the light from the display, in accordance with the techniques of the disclosure.

In general, components of FIG. 5 may operate similar to the components of FIG. 1 described herein. However, in contrast to the example of FIG. 1, at least a portion of the functions of adaptively performing color correction using content display color information and, optionally, known user characteristics may be performed remotely by a video call management system 510. For example, in this illustration, video calls between video presence systems 12, 14 are routed through video call management system 510. In some example approaches, video call management system 510 provides billing and administration services supporting video calls across network 502.

Moreover, as illustrated in FIG. 5, in one example approach, a color correction unit 36 located in system 510 may incorporate functionality for any of AOI detector 122, AOI color analyzer 123, and or AOI color corrector 124 may be offloaded to video call management system 510. That is, image data associated with the video call and sourced by each of video presence systems 12, 14 may be routed through cloud-based correction unit 36. Based on color information for the image data of a first one of the video streams (e.g., such as the video stream sourced by video presence system 14 for display to user 30A), color correction unit 36 performs facial color analysis and color correction for the area of interest within the image data of the second video stream in the opposite direction (e.g., the image data sourced by video presence system 12). In other words, video call management system 510 may extract and use the color information for the content of the video stream currently being presented by display 18A to perform color correction on the detected facial regions within the video stream to be presented by display 18B. Similarly, video call management system 510 may extract and use the color information for the content of the video stream currently being presented by display 18B to perform color correction on the detected facial regions within the video stream to be presented by display 18A. After pre-processing the areas of interest and performing color correction upon determining the regions are currently being affected by the content being rendered at the site, video call management system may perform additional color correction, such as white balance adjustment for the entire image using, for example, ambient light measurements sampled at the remote site. In this way, functions of adaptively performing color correction using color information for content currently being displayed and, optionally, known user characteristics may be performed remotely by a video call management system 510.

In some example approaches, color correction unit 36 applies policies stored in policy repository 512 to information received via image capture system 20A, from sensors such as ambient light color sensor 22, and from a priori knowledge of the display content 35 to determine from the monitored conditions how to adaptively select between different color correction techniques. In other example approaches, color correction unit 36 applies policies stored in policy repository 512 to information received via image capture system 20A, from sensors such as ambient light color sensor 22 monitoring lighting conditions, and from a priori knowledge of the display content 35 and the color characteristics of the user to determine from the monitored conditions how to adaptively select between different color correction techniques. Accordingly, the techniques of the disclosure provide specific improvements to the computer-related field of rendering and displaying content within a video presence system. A video presence system as described herein may, therefore, provide a high-quality video communication experience that remains consistent across a variety of lighting conditions and across a variety of displays 18 and image capture systems 20.

Figure 6:
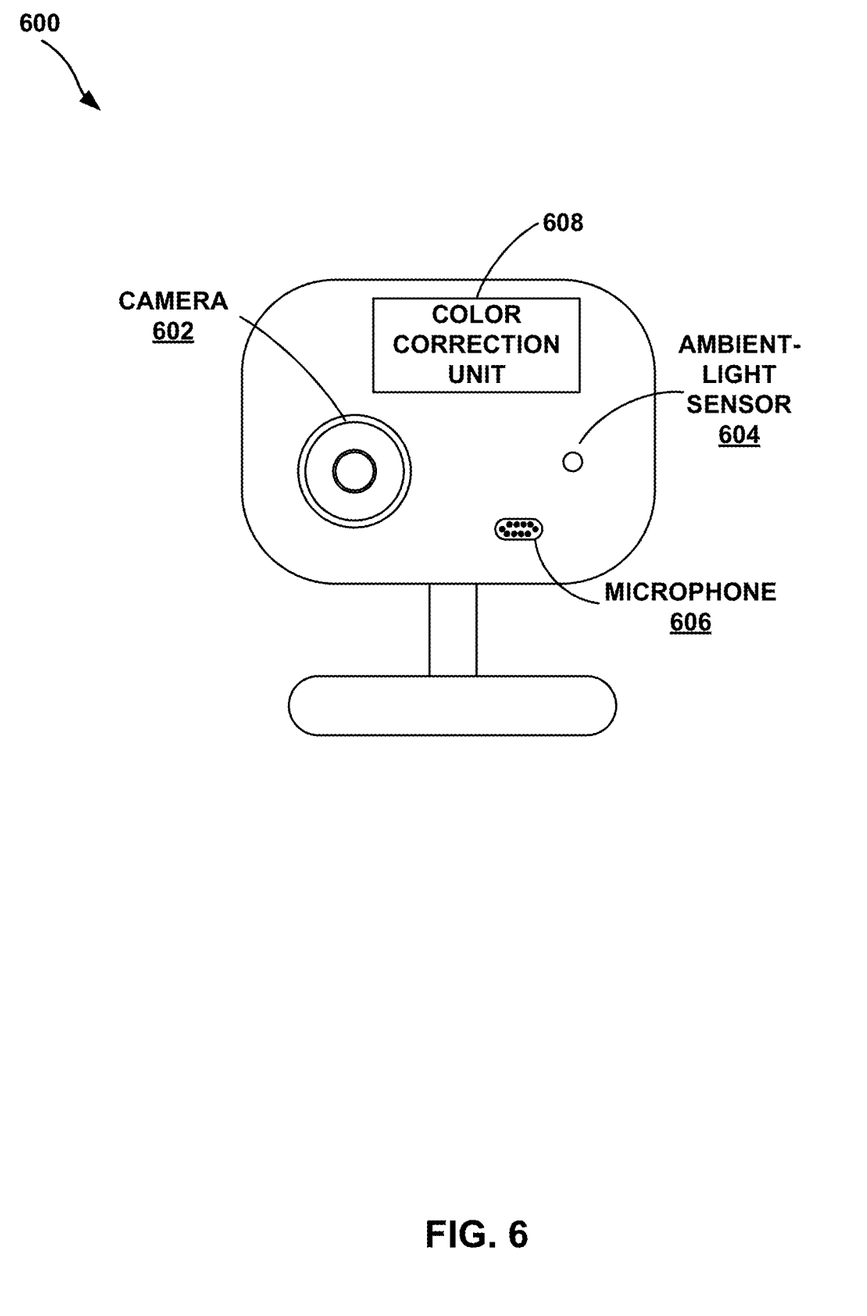
FIG. 6 is a block diagram illustrating an example integrated video presence system that detects a facial region within captured image data and analyzes the facial region using known color information of the content currently being presented by the display, along with measured ambient light color information from a color sensor, to determine whether the face is currently affected by the display, in accordance with the techniques of the disclosure.

FIG. 6 is a block diagram illustrating an example integrated video presence system that detects a facial region within captured image data and analyzes the facial region using known color information of the content currently being presented by the display, along with measured ambient light color information from a color sensor, to determine whether the face is currently affected by the display, in accordance with the techniques of the disclosure. In the example approach shown in FIG. 6, video presence system 600 includes a camera 602, an ambient light color sensor 604, a microphone 606 and a color correction unit 608. In some example approaches, a user adds video presence system 600 to a display (not shown) to allow the display to be used as part of a video communications system. As noted above, ambient light color sensor 604 provides color information regarding the ambient light. In some example approaches, ambient light color sensor 604 uses color filters and a diffuser as discussed in the discussion of FIG. 1 above.

In one example approach, camera 602 and microphone 606 capture image and voice data for use in video communications while color correction unit 608 corrects the color in the images captured by camera 602 using, for instance, the combination of ambient light sensor information and color information for content currently being projected, or the combination of known user color characteristics, ambient light sensor information and projected display light, as described herein.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

As described by way of various examples herein, the techniques of the disclosure may include or be implemented in conjunction with a video communications system. The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A system comprising:
    a video conference application configured to output display content on a display;
    a memory, wherein the memory stores information associated with users known to the video conference application, wherein the stored information includes facial color information for each of the known users;
    an input capture system having an ambient light sensor and one or more processors, the processors configured to capture an image of a user at a location;
    an area of interest (AOI) detector configured to identify an AOI within the image, wherein the AOI identified includes at least a portion of the face of the user;
    a detector configured to determine, from the AOI, whether the user is one of the known users;
    an AOI color analyzer configured to analyze image data associated with the identified AOI and to determine, based on color information associated with the display content and on an ambient light measurement made at the location by the ambient light sensor, the extent to which the area of interest was illuminated by light from the display during capture of the image; and
    a color corrector configured to, responsive to determination that the area of interest was illuminated by light from the display, perform color correction on the image, wherein the color corrector is configured to adjust the color of the face of the user within the area of interest based on the measured ambient light, the extent to which the area of interest was illuminated by light from the display during capture of the image, and, if the user is a known user, the facial color information stored in memory for the known user.

2. The system of claim 1, further comprising a white balance adjuster configured to perform ambient light correction on the image data after the color corrector performs color correction on the image data of the area of interest.

3. The system of claim 1, wherein the AOI color analyzer is configured to analyze color information for the identified AOI within the image data, the analysis determining that the area of interest was illuminated by light from the display when a face color of the AOI is within a statistical skin color area in a Chromaticity diagram for the display content.

4. The system of claim 1,
    wherein the AOI detector is trained on one or more calibration images of the user to determine whether the AOI matches the user, and
    wherein the AOI color analyzer is configured to analyze the image data associated with the AOI only when the AOI matches the user.

5. The system of claim 4, wherein the AOI color analyzer is further configured to determine whether the area of interest was illuminated by light from the display during capture of the image data based on user-specific color characteristics for the user extracted from the one or more calibration images.

6. The system of claim 1, further comprising a video presence device comprising one or more processors for execution of the video conference application.

7. The system of claim 6, wherein the AOI detector, AOI color analyzer and the color corrector execute on the processors of the video presence device.

8. The system of claim 7, wherein at least one of the AOI detector, AOI color analyzer and the color corrector execute on one or more processors of a video call management system.

9. A method comprising:
outputting, with a video conference application, display content on a display;
capturing an image of a user at a location;
identifying an area of interest (AOI) within the image, wherein the AOI identified includes at least a portion of the face of the user;
determining whether the user is a known user, wherein the video conference application maintains facial color information for each of the known users;
determining, based on color information for the display content and on an ambient light measurement made by an ambient light sensor at the location, the extent to which the area of interest was illuminated by light from the display during capture of the image; and
responsive to determining that the area of interest was illuminated by light from the display, performing color correction on the image, wherein performing color correction includes adjusting a color within the area of interest based on the measured ambient light, the extent to which the area of interest was illuminated by light from the display during capture of the image, and, if the user is a known user, the facial color information of the known user.

10. The method of claim 9, further comprising processing the image data to perform white balance correction based on the measured ambient light after performing color correction on the image data of the area of interest.

11. The method of claim 9, wherein analyzing the image for the identified AOI comprises determining whether a color of the image data for the identified AOI is within a statistical skin color area in a Chromaticity diagram for the display content.

12. The method of claim 9, further comprising:
training an AOI detector on one or more calibration images of the user to determine whether the AOI matches the user; and
analyzing the image data associated with the AOI only when the AOI matches the user.

13. The method of claim 12, wherein determining whether the area of interest was illuminated by light from the display during capture of the image data is based on user-specific color characteristics for the user extracted from the one or more calibration images.

14. A non-transitory, computer-readable medium comprising instructions that, when executed, cause one or more processors to:
output, with a video conference application, display content on a display;
capture an image of a user at a location;
identify an area of interest (AOI) within the image, wherein the AOI identified includes at least a portion of the face of the user;
determine, from the AOI, whether the user is a known user, wherein the video conference application maintains facial color information for each of the known users;
determine, based on color information for the display content and on an ambient light measurement made by an ambient light sensor at the location, that the area of interest was illuminated by light from the display during capture of the image data; and
responsive to determining that the area of interest was illuminated by light from the display, perform color correction on the image, wherein performing color correction includes adjusting a color within the area of interest based on the measured ambient light, the extent to which the area of interest was illuminated by light from the display during capture of the image, and, if the user is a known user, the facial color information for the known user.

15. The computer-readable medium of claim 14, further comprising processing the image data to perform white balance correction based on the measured ambient light after performing color correction on the image data of the area of interest.

16. A video presence system, comprising:
a display;
a camera;
an ambient light sensor;
one or more processors, the one or more processors connected to the display, the camera and the ambient light sensor, the processors configured to output display content on a display;
memory connected to the one or more processors, wherein the memory includes facial color information for one or more known users; and
a color correction unit connected to the ambient light sensor, wherein the color correction unit receives an image of a user at a location, determines if the user is one of the known users, and corrects color within the image before transmitting the color corrected image, and wherein the color correction includes a first correction based on an ambient light measurement made by the ambient light sensor at the location and a second correction based on display light associated with the display content, wherein the color correction unit is configured to adjust a color of the face of the user within the area of interest based on the ambient light measurement, the extent to which the area of interest was illuminated by light from the display during capture of the image, and, if the user is one of the known users, the facial color information for the known user.

17. The video presence system of claim 16, wherein the first correction is applied only to an identified area of interest within the image.

18. A method comprising:
detecting one or more known faces in image data of a scene captured by a video camera;
retrieving facial color information for each detected known face;
receiving, from an ambient light sensor, a measurement of ambient light falling on the scene;
determining chromaticity in display content output on a display at the scene during capture of the image data;
analyzing color of the image data for each detected known face to determine, for each respective detected known face, based on the chromaticity of the received display content and facial skin color characteristics for each respective detected known face, whether the known face detected in the scene is affected by light from a display displaying the display content;
when any of the known faces detected in the scene are affected by light from a display displaying the display content:
correcting image data based on the ambient light measurement, the extent to which the area of interest was illuminated by light from the display during capture of the image, and the facial color information retrieved for each respective known user detected in the scene; and when none of the detected known faces are affected by light from a display displaying the display content, applying ambient light correction across the image.

19. The method of claim 18, wherein determining chromaticity in received display content includes determining chromaticity as a function of the received display content and the measurement of ambient light.

* * * * *